3,444,175
CERTAIN PICOLYLMETHYL SULFONES
Tsung-Ying Shen, Westfield, Alexander Matzuk, Colonia, and Conrad P. Dorn, Jr., Plainfield, N.J., assignors to Merck & Co., Inc., Rahway, N.J., a corporation of New Jersey
No Drawing. Filed Nov. 9, 1966, Ser. No. 592,990
Int. Cl. C07d 31/48; A61k 27/00
U.S. Cl. 260—294.8     4 Claims

ABSTRACT OF THE DISCLOSURE

This invention describes new heterocyclicmethylsulfones and their method of preparation. The compounds of this invention exhibit antiinflammatory properties and, as such, are useful as active ingredients for pharmaceutical compositions used in treating inflammation.

---

This invention relates to a method of treating inflammation utilizing novel antiinflammatory compositions containing heterocyclylmethyl alkyl sulfones. In addition, these novel compositions exhibit potent analgesic and antipyretic activity and, therefore, this invention also relates to analgesic and antipyretic methods and compositions. More particularly, this invention is concerned with the use of heterocyclylmethyl aliphatic sulfones as the active therapeutic ingredient in pharmaceutical compositions.

This invention also relates to certain novel sulfones of the structural formula:

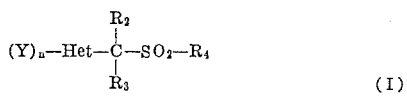

and processes for their preparation, as well as intermediates therefor, wherein "Het" represents 5- or 6-membered heteroaromatic ring compounds having less than three rings. The heteroaromatic rings may contain one or more nitrogen or sulfur atoms; or an oxygen atom together with one or more oxygen, nitrogen or sulfur atoms. Examples of such heteroaromatic rings include thiophene, pyrrole, pyrazole, imidazole, thiazole, oxazole, isoxazole, pyridine, quinoline, pyran, isothiazole, triazole, furan (when Het is furyl, $R_4$ is other than methyl), benzimidazole, benzoxazole, benzoisoxazole, benzothiazole, benzodioxane, indazole and indole. The heteroaromatic nucleus may be substituted, with one or more hydrocarbon groups or with functional substituents (shown as $Y_n$ above, wherein $n$ is 0 to 2). The hydrocarbon group includes particularly the lower alkyl, such as methyl, ethyl, propyl and butyl; and also includes an unsaturated radical such as lower alkenyl or vinyl, and a cyclic aliphatic residue (cyclic lower alkyl) such as cyclopropyl, cyclopentyl and cyclohexyl. The term "functional substituent" refers to a substituent other than hydrogen or hydrocarbons. The functional substituents include halo, especially chloro, bromo or fluoro, amino, lower alkylamino, di (lower alkyl) amino, hydroxy, lower alkoxy, mercapto, lower alkylmercapto, nitro and lower alkanoyl. The carbon atom α to the heterocyclic moiety may contain hydrogen or be substituted with a lower alkyl or lower alkenyl group; shown as $R_2$ and $R_3$ above. Further, $R_4$ shown above may be lower alkyl or lower alkenyl, preferably lower alkyl and especially methyl.

The heterocyclylmethyl aliphatic sulfones of this invention represent a new milestone in the continuing search for potent, low toxicity, antiinflammatory agents. These sulfones provide a unique structure-activity relationship which not only has resulted in high antiinflammatory, antipyretic, and analgesic potency, but also appear to exhibit a biological profile quite different from the salicylates and phenylbutazone.

The above defined sulfone compounds are administered to a patient in a dosage unit form, a pharmaceutically acceptable composition containing a therapeutically effective amount of a heterocyclylmethyl aliphatic sulfone such as 4-methylsulfonylmethylthiazole.

A preferred embodiment of this invention is a method of treating a disease which is symptomatically characterized by pain, fever and/or inflammation which comprises the administration to a patient in dosage unit form of between about 0.01 and 5 gm. of the heterocyclylmethyl methyl sulfone per day. On a kilogram basis, it is preferred to utilize between about 0.5 mg./kg. and 70 mg./kg. per day of the heterocyclylmethyl aliphatic sulfones of this invention. Another embodiment of this invention is the provision of pharmaceutical compositions in dosage unit form which comprise from about 5 to 500 mg., and preferably from 25 to 250 mg., of the heterocyclymethyl aliphatic sulfone of the above formula. 4-methylsulfonylmethylthiazole, in oral dosage unit form, comprising about 25 to about 500 mg. is a preferred pharmaceutical composition of this invention.

In a preferred embodiment of this invention, the novel heterocyclylmethyl aliphatic sulfones (I) wherein $R_2$ and $R_3$ are each hydrogen, are prepared by reacting a compound having Formula (II) with an alkali metal $R_4$-sulfinate (III), as illustrated by the following reaction scheme:

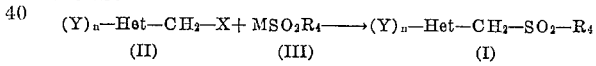

where X represents chloro, bromo or iodo, and M represents an alkali metal atom.

The above reaction takes place by dissolving approximately equimolar quantities of the heterocyclic reactant (II) in a solvent, and adding thereto the alkali metal $R_4$-sulfinate (III). When an acid salt of the heterocyclic reactant (II) is used, an alkaline agent, such as potassium hydroxide, is first added to the solution of the heterocyclic reactant (II) before adding the alkali metal $R_4$-sulfinite (III). In place of potassium hydroxide, other alkali and alkali earth hydroxides and alkoxides or aliphatic amines may be used.

A preferred solvent is ethanol. Other solvents which are suitable for this reaction include the various lower alkanols, dimethylformamide, 1,2-dimethoxyethane, tetrahydrofuran, etc.

The reaction mixture is heated at an elevated temperature for several hours. The reaction temperature is not critical, although temperatures in the range of 80–100° C. are preferred. Lower reaction temperatures may be employed if the particular reactants are unduly susceptible to decomposition.

The reaction is usually complete in a 4–16 hours, but the time period is not critical.

Generally, the chloro or bromo derivative of heterocyclic reactant (II) (X=Cl or Br) is preferred because of its greater availability. If the chloro-derivative is insufficiently reactive for practical purposes, the chloro group in reactant (II) may be replaced by iodo, for example, by heating with an alkali metal iodide.

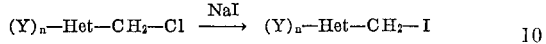

In the alternative, the reaction of a

compound (II) with the alkali metal R$_4$-sulfinate (III) may be carried out in the presence of a small amount of an alkali metal iodide as a catalyst. The heteroaromatic ring compounds (II) where X is a halogen are known in some instances. They can also be prepared by known techniques.

In a preferred embodiment of this invention (where R$_2$ and R$_3$ are each hydrogen), the —CH$_2$Cl group is introduced into the heterocyclic ring by reaction with formaldehyde and dry HCl, in the presence of a condensing agent such as zinc chloride. In the alternative this reaction can be carried out in two steps by reacting the heterocyclic compound with an aqueous solution of formaldehyde and aqueous HCl to give the hydroxymethyl substituent, which may be converted into the chloromethyl derivative by reaction with thionyl chloride.

The hydroxymethyl derivative may be prepared also from a heterocyclic compound already having a formyl substituent (—CHO) by reduction, for example, with sodium borohydride; or from a heterocyclic compound having a carbonylethoxy substituent (COOC$_2$H$_5$) by reduction, for example, with lithium aluminum hydride. The carbonylethoxy substituent (COOC$_2$H$_5$) may be derived from a corresponding carboxy substituent (COOH) by esterification. The carboxy substituent in turn may be obtained by oxidation of a methyl substituent, all by methods known in the art. Thus, a halomethyl substituent of the heterocyclic reactant (II) may be introduced into the heterocyclic ring directly, or derived from a known heterocyclic compound which has a methyl, carboxy, carbonylalkoxy, formyl, or hydroxymethyl group already present in the ring.

Indole compounds having the following formula:

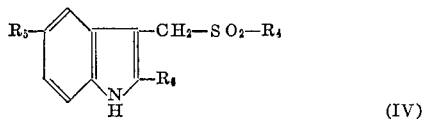

where R$_5$ and R$_6$ represent the various Y substituents previously mentioned, can be prepared in two steps by reacting an indole compound having Formula V

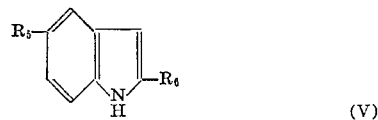

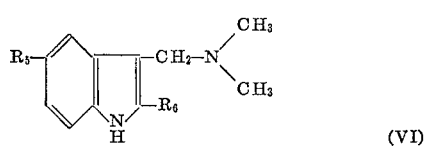

with an aqueous solution of dimethylamine and an aqueous solution of formaldehyde to obtain a compound having Formula (VI), wherein R$_5$ and R$_6$ have the meaning above defined, which compound is then reacted with an alkali metal methyl sulfinate (III) in the presence of dimethyl sulfate. The compound of Formula V can be readily prepared following the procedures set forth in columns 2 and 3 of United States Patent No. 2,825,734.

When the heterocyclic moiety contains an active nitrogen, such as in the case of pyrazole, and it is desired to obtain the sulfone moiety on said nitrogen, the following reaction sequence is followed:

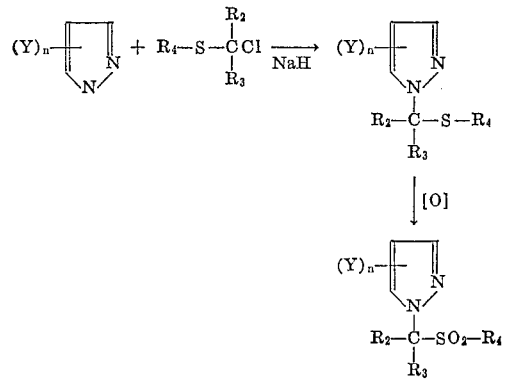

The heterocyclic compound is reacted with sodium hydride to activate the nitrogen. This activated compound is then reacted with a chloro sulfide compound, i.e., (chloromethyl methylsulfide). The heterocyclic sulfide compound thus prepared is then oxidized to the desired sulfone compound.

When it is desired to prepare the sulfone compounds containing an α alkyl or alkenyl (i.e., R$_2$ and/or R$_3$ is other than hydrogen), two general methods are applicable.

When the heterocyclic moiety contains a nitrogen, for example, pyrrole, the starting material is an alkyl or alkenyl substituted pyrrole, which compound is reacted with N-bromo succinimide in carbon tetrachloride in the presence of a catalytic amount of peroxide at temperatures between 25–40° C. This reaction results in the bromination of the α-carbon on the alkyl side chain. This brominated compound is then reacted in accordance with the previous description (i.e., reaction with an alkali metal R$_4$-sulfinate) to form the desired α-substituted heterocyclic sulfone compound.

When the heterocyclic moiety does not contain a nitrogen atom, still another reaction sequence is followed. For example, the thiazole sulfone final product (α-unsubstituted) is reacted with a strong base to which an alkyl iodide or alkenyl iodide is added, to form the α-substituted compound. If it is desired to form an α-disubstituted compound, at least 2 equivalents of iodide and base are effectively used.

The following examples are given to further describe the invention.

EXAMPLE 1

Methylsulfonylmethyl pyridines

A solution of 85% potassium hydroxide (2.8 grams, 0.05 mole) in 100 ml. of ethanol is mixed with 4-chloromethylpyridine hydrochloride (8.2 grams, 0.05 mole). Sodium methyl sulfinate monohydrate (6.0 grams, 0.05 mole) is added and the mixture is refluxed with stirring for about two hours and then evaporated under vacuum. The residue is dissolved in water, saturated with sodium chloride, and extracted two times with chloroform. The chloroform extract is dried and evaporated under vacuum. The residue is recrystallized from ethanol to yield 3.1 grams of 4-methylsulfonylmethylpyridine, M.P. 134–136° C.

*Analysis.*—Calculated for C$_7$H$_9$NO$_2$S: C, 49.12; H, 5.30; N, 8.18; S, 18.72. Found: C, 49.24; H, 5.02; N, 7.89; S, 18.67.

Employing the method of Example 1, but substituting for 4-chloromethylpyridine hydrochloride an equimolar amount of 2-chloromethylpyridine hydrochloride, there is obtained 2-methylsulfonylmethylpyridine, M.P. 123–124° C.

*Analysis.*—Calc'd for $C_7H_9NO_2S$: C, 49.12; H, 5.30; N, 8.18; S, 18.72. Found: C, 49.42; H, 5.24; N, 8.27; S, 18.42.

Employing the above method but substituting for 4-chloromethylpyridine hydrochloride an equimolar amount of 3-chloromethylpyridine hydrochloride, there is obtained 3-methylsulfonylmethylpyridine, M.P. 128–130° C.

*Analysis.*—Calc'd for $C_7H_9NO_2S$: C, 49.12; H, 5.30; N, 8.18; S, 18.72. Found: C, 49.13; H, 5.13; N, 7.95; S, 18.80.

EXAMPLE 2

2-chloro-5-methylsulfonylmethylthiophene

STEP A.—PREPARATION OF 2-CHLOROMETHYL-5-CHLOROTHIOPHENE

A mixture of concentrated HCl (45.6 ml.) and 37% Formalin (45 ml.) is saturated with dry HCl at 0–10° C. with stirring, and added in a slow stream to a mixture of 5-chlorothiophene (71.6 grams) and zinc chloride at 35–40° C. (1 gram). The reaction mixture is then stirred for an additional two hours. Cold water (114 ml.) is then added. The oil which separates is washed two times with cold water. Dicyclohexylamine (2 cc.) is then added and the product distilled under vacuum; the portion boiling at 90–96° C./9–10 mm. is collected.

STEP B.—PREPARATION OF 2-CHLORO-5-METHYL-SULFONYLMETHYLTHIOPHENE 2-chloro-5-chloromethylthiophene (8.35 grams) from Step A in 100 ml. of acetone, sodium methylsulfinate (6 grams, 0.05 mole) and sodium iodide (0.6 gram) are stirred and refluxed overnight. The product is evaporated under vacuum and the residue distributed between chloroform and water. The water layer is extracted two times with chloroform. The chloroform extracts are combined, dried, and evaporated under vacuum. The residue is recrystallized from ethanol with charcoaling. The product is then purified by extraction with ether, filtering, charcoaling, and boiling to a small volume. The ether extract is filtered, washed with ether and air-dried to yield 4.87 grams of 2-chloro-5-methylsulfonylmethylthiophene, M.P. 79–80° C.

*Analysis.*—Calc'd for $C_6H_7ClO_2S_2$: C, 34.20; H, 3.35; Cl, 16.83; S, 30.43. Found: C, 34.80; H, 3.52; Cl. 16.61; S, 32.94.

EXAMPLE 3

2-methylsulfonylmethylthiazole

STEP A.—PREPARATION OF 2-HYDROXY-METHYLTHIAZOLE

Thiazole (17 grams, 14.2 mole) and 40% aqueous Formalin solution (50 ml.) are heated at about 120° C. for eight hours with agitation. The product is cooled and then acidified with 2.5 N HCl and extracted with ether. The aqueous solution is neutralized with solid potassium carbonate with stirring. The product is then extracted four times with ether. The combined ether extracts are dried over sodium sulfate and filtered and concentrated. The yellow liquid remaining is taken up in 100 ml. of a mixture of 1:1 $H_2O$:conc. HCl. The solution is then filtered and concentrated to give an oil which solidifies. The product is triturated with ethanol, filtered and washed with ethanol to yield 1.76 grams of 2-hydroxymethylthiazole hydrochloride, M.P. 123–125.5° C.

STEP B.—PREPARATION OF 2-CHLORO-METHYLTHIAZOLE

The 2-hydroxymethylthiazole hydrochloride (1.76 g.) from Step A is suspended in 16 cc. of dried chloroform. Thionyl chloride (3.57 g., 0.03 mole) in 10 cc. of chloroform is added over a time period of five minutes; the mixture is stirred for one hour at room temperature and then refluxed on a steam bath for one hour and forty-five minutes. The product is cooled, concentrated under vacuum, made alkaline with potassium carbonate and then extracted with ether. The ether extract is dried over sodium sulfate, filtered, and the ether distilled off to give a residue of 2-chloromethylthiazole.

STEP C.—PREPARATION OF 2-METHYLSULFONYL-METHYLTHIAZOLE

The 2-chloromethylthiazole of Step B is dissolved in 20 ml. of ethanol, sodium methylsulfinate (0.9 gram) is added and the mixture is refluxed overnight and filtered hot. The filtrate is cooled, and concentrated to a residue which is distributed between chloroform and water. The chloroform extract is dried over sodium sulfate, filtered, and concentrated under vacuum to give 938 mg. of 2-chloromethylthiazole. The product is separated by chromatography to give 506 mg. of product, M.P. 83.5–86° C.

*Analysis.*—Calc'd for $C_5H_7NO_2S_2$: C, 33.88; H, 3.98; N, 7.90; S, 36.18. Found: C, 34.32; H, 3.98; N, 7.39; S, 36.20.

EXAMPLE 4

4-methylsulfonylmethylthiazole

STEP A.—PREPARATION OF 4-HYDROXY-METHYLTHIAZOLE 4-formylthiazole (20 grams, 0.177 mole) and ethanol (175 ml.) is added to sodium borohydride (3.4 g., 0.089M) in 75 ml. of ethanol. The mixture is stirred and kept at about 25°±2° C., with an ice bath. The addition takes approximately 0.5 hour, and stirring is continued for an additional 1.0 hour at room temperature. Glacial acetic acid (6 ml.) in water (20 ml.) is added dropwise. The product is evaporated under vacuum to a small volume and extracted three times with chloroform. The chloroform solution is washed with saturated sodium bicarbonate and then water. It is then dried and evaporated under vacuum to give 3.44 grams of 4-hydroxymethylthiazole.

STEP B.—PREPARATION OF 4-CHLORO-METHYLTHIAZOLE

Thionyl chloride (10 ml.) is added dropwise with cooling to the 4-hydroxymethylthiazole (3.44 grams) of Step A. A vigorous reaction results. After completion, the excess thionyl chloride is then removed under vacuum to yield 4-chloromethylthiazole hydrochloride.

STEP C.—PREPARATION OF 4-METHYLSULFONYL-METHYLTHIAZOLE

The 4-chloromethylthiazole hydrochloride from Step B is added to a solution of sodium hydroxide (1.2 grams) in 50 ml. of ethanol. Sodium methylsulfinate (3.5 g.) is added and the mixture refluxed with stirring overnight. The product is evaporated under vacuum and the residue distributed between water and chloroform. The chloroform extract is dried, and evaporated under vacuum to give a residue which is recrystallized from boiling ethanol with charcoaling. The product is washed with ether and air-dried to yield 1.1 grams of 4-methylsulfonylmethylthiazole, M.P. 88–90° C.

*Analysis.*—Calc'd for $C_5H_7NO_2S_2$: C, 33.88; H, 3.98; N, 7.90; S, 36.18. Found: C, 34.15; H, 3.84; N, 8.01; S, 36.34.

EXAMPLE 5

1-methyl-3-methylsulfonylmethylpyrazole

STEP A.—PREPARATION OF 3-CARBOXYPYRAZOLE 3-methylpyrazole (45 grams) is dissolved in 2700 ml. of water. Powdered potassium permanganate (180 grams) is added in portions starting at room temperature and gradually heating to about 90° C. on a steam bath. After the purple color is gone the product is filtered and the solid washed with water. The filtrate is evaporated under vacuum to a small volume and then acidified with concentrated HCl to pH=2 and cooled. The precipitate is filtered and washed with cold water and air-dried to give 25.2 grams. The filtrate is evaporated to dryness, extracted with ethanol and evaporated to dryness again. The residue is extracted again with boiling ethanol and taken to dryness to give 23.6 grams. The combined residues equal 48.8 grams.

STEP B.—3-ETHOXYCARBONYLPYRAZOLE

Ethanol (300 ml.) is added to the 3-carboxypyrazole (48.8 grams) of Step A. The mixture is saturated with HCl and then refluxed with stirring for about 5 hours. HCl is occasionally passed in. The product is evaporated under vacuum and the solid residue distributed between sodium carbonate solution and chloroform. The chloroform layer is dried and evaporated under vacuum. The residue is recrystallized from boiling methanol to give 36.2 grams of 2-ethoxycarbonylpyrazole.

STEP C.—3-HYDROXYMETHYLPYRAZOLE

Lithium aluminum hydride (16.3 g.) in 1.5 liters of dry ether is refluxed with stirring overnight with 3-ethoxycarbonylpyrazole (30.3 grams). Water (about 55 milliliters) is added dropwise and the ether is evaporated under vacuum. The residue is treated with methanol, and saturated with carbon dioxide. The product is heated to boiling and filtered. The solid is washed with boiling methanol and the methanol solution evaporated under vacuum to small volume. The product is then heated to boiling and filtered. Evaporation of the solvent yields 21.00 grams of a syrup which is the 3-hydroxymethylpyrazole.

STEP D.—PREPARATION OF 3-CHLOROMETHYLPYRAZOLE

Thionyl chloride (35 ml.) is added dropwise to the 3-hydroxymethylpyrazole (21.0 g.) obtained in Step C. The reaction mixture is then warmed on a steam bath for 15 minutes. The excess thionyl chloride is removed under vacuum and the residue washed with ether and dried under vacuum to yield 31.1 g. of 3-chloromethylpyrazole hydrochloride.

STEP E.—PREPARATION OF 3-METHYLSULFONYLMETHYLPYRAZOLE 3-chloromethylpyrazole hydrochloride (8.2 g.) from Step D is added to a stirred solution of 85% potassium hydroxide (3.5 g.) in 75 ml. of ethanol. Sodium methyl sulfinate (6.5 grams) is then added and the mixture stirred and refluxed overnight. The residue is evaporated to dryness under vacuum, extracted with chloroform, filtered, and washed with excess chloroform. The filtrate is evaporated under vacuum to give 9.3 grams of 3-methylsulfonylmethylpyrazole. The product is purified by chromatography.

STEP F.—PREPARATION OF 1-METHYL-3-METHYLSULFONYLMETHYLPYRAZOLE 3-methylsulfonylmethylpyrazole (4.5 grams) from Step E, is added to 85% potassium hydroxide (1.8 grams), ethanol (5 ml.) and 1 ml. of water with stirring. When the mixture is homogeneous methyl iodide (10 ml. in 10 ml. of ether) is added over a 10–15 minute time period, and the reaction mixture is refluxed for two hours and then cooled to room temperature overnight. The product is extracted with chloroform, filtered, and the solid washed with chloroform. The chloroform extract is dried and evaporated under vacuum to yield 4.5 grams of crude product. Purification by extraction with a mixture of 50% chloroform and acetone and recrystallization from ethanol gives 1-methyl-3-methyl-sulfonylmethylpyrazole, M.P. 79–81° C.

Analysis.—Calc'd for $C_6H_{10}N_2O_2S$: C, 41.38; H, 5.79; N, 16.09; S, 18.40. Found: C, 41.48; H, 5.54; N, 16.30; S, 18.63.

EXAMPLE 6

4-methylsulfonylmethylimidazole

STEP A.—PREPARATION OF 4,5-DICARBOXYIMIDAZOLE 4,5-di(ethoxycarbonyl)imidazole (100 grams) in 400 ml. in 2.5 N sodium hydroxide solution (400 ml.) is allowed to stand at room temperature overnight. The disodium salt precipitates. It is mixed with concentrated HCl, cooled and filtered. The filtrate is stirred with fresh water, filtered and air-dried to give 72 grams of 4.5-dicarboxy imidazole.

STEP B.—PREPARATION OF 4-ANILINOCARBONYLIMIDAZOLE

A mixture of 4,5-dicarboxyimidazole from Step A (200 grams) and aniline (1000 ml.) is refluxed with stirring for three days. The aniline is then removed by steam distillation. The product is filtered, washed with water and then dissolved in acid. The insolubles are filtered off and the filtrate made alkaline with sodium carbonate. The precipitate is then filtered and washed with water.

STEP C.—PREPARATION OF 4-CARBOXYIMIDAZOLE

The 4-anilinocarboxyimidazole from Step B is added to 1000 ml. of concentrated HCl and the mixture refluxed for four hours and then taken to dryness. The residue is dissolved in water, made alkaline with sodium carbonate, extracted with ether, charcoaled, adjusted to pH=4 with HCl, and allowed to stand in the cold overnight. The product is then filtered and washed with cold water. The filtrate is evaporated at room temperature and atmospheric pressure. The residue is washed with cold water and air-dried to yield 85 grams.

STEP D.—PREPARATION OF 4-ETHOXYCARBONYLIMIDAZOLE

A mixture of the 4-carboxyimidazole from Step C and 1½ liters of ethanol is saturated with HCl and refluxed until homogeneous. The reaction mixture is evaporated under vacuum. The residue is then dissolved in water, charcoaled, and treated with sodium bicarbonate. The solid is filtered, washed with cold water, and air-dried. The aqueous filtrate is extracted with chloroform, and the chloroform evaporated under vacuum. The total yield of product is 73 grams.

STEP E.—PREPARATION OF 4-HYDROXYMETHYLIMIDAZOLE 4-ethoxycarbonylimidazole (28 grams) from Step D is added portionwise with stirring over a half hour period to lithium aluminum hydride (10 g.) in 30 ml. of ether. After the addition is complete, the reaction mixture is allowed to stand overnight. Water (25 ml.) is added dropwise. The resulting solid is filtered and suspended in 300 ml. of hot methanol, saturated with carbon dioxide, and filtered. The product is extracted again with hot methanol. The extracts are combined and evaporated under vacuum. The residue is taken up in 300 ml. of hot ethanol, filtered and evaporated under vacuum. The residue is then treated with ethanolic HCl. The resulting solid is cooled, diluted with ether, and then filtered. The product is then washed with ether and dried under vacuum.

STEP F.—PREPARATION OF 4-CHLOROMETHYLIMIDAZOLE 4-hydroxymethylimidazole hydrochloride (10 grams) from Step E is suspended in 50 ml. of dry benzene, and 14 ml. of thionyl chloride in 50 ml. of benzene is added slowly with stirring. After addition is complete the reaction mixture is refluxed with stirring for two hours. It is then evaporated under vacuum, to yield the 4-chloromethylimidazole hydrochloride.

STEP G.—PREPARATION OF 4-METHYLSULFONYLMETHYLIMIDAZOLE

The 4-chloromethylimidazole hydrochloride from Step F is dissolved in 100 ml. of absolute ethanol and treated with sodium ethylate (4.05 g.) in absolute ethanol (50 ml.). Sodium methyl sulfinate and the mixture is refluxed overnight. The product is then evaporated under vacuum and the residue extracted with chloroform. The chloroform is evaporated under vacuum to give 10.8 g. of 4-methylsulfonylmethylimidazole. The product is chromatographed to give pure 4-methylsulfonylmethylimidazole, M.P. 140–141° C.

*Analysis.*—Calc'd for $C_5H_8N_2O_2S$: C, 37.50; H, 5.04. Found: C, 38.37; H, 4.30.

EXAMPLE 7

2-methylsulfonylmethylbenzimidazole 2-chloromethylbenzimidazole (8.3 grams), ethanol (100 ml.) and sodium methyl sulfinate (6.0 g.) are stirred and refluxed for 3 hours. The product is evaporated under vacuum, and the residue distributed between water and chloroform. The chloroform extract is dried and evaporated under vacuum. The residue is recrystallized from ethanol, washed with cold ethanol and ether, and air-dried to give 3.36 grams of 2-methylsulfonylmethylimidazole, M.P. 200–202° C.

*Analysis.*—Calc'd for $C_9H_{10}N_2O_2S$: C, 51.42; H, 4.80; N, 13.33; S, 15.25. Found: C, 51.53; H, 4.42; N, 13.06; S, 13.60, 15.64.

EXAMPLE 8

2-methylsulfonylmethyl-1,4-benzodioxane

STEP A.—PREPARATION OF 2-IODOMETHYL-1,4-BENZODIOXANE

A mixture of 2-chloromethyl-1,4-benzodioxane (12 g.) in acetone (50 ml.) and sodium iodide (9.75 g.) is stirred and refluxed for 3 days. The precipitate which forms is filtered off and washed with acetone. The filtrate is evaporated under vacuum and extracted with chloroform, to yield 14.81 grams of an oil $n_D^{24}$ 1.5780.

STEP B.—PREPARATION OF 2-METHYLSULFONYL-METHYL-1,4-BENZODIOXANE

A mixture of the 2-iodomethyl-1,4-benzodioxane from Step A, in ethanol (50 ml.) and sodium methyl sulfinate (6.5 grams) is refluxed overnight. The precipitate which forms is filtered off and washed with acetone. The filtrate is evaporated under vacuum, extracted with chloroform and the chloroform evaporated under vacuum to leave a residue which is recrystallized from ethanol to yield 2-methylsulfonylmethyl - 1,4 - benzodioxane, M.P. 145–147° C.

*Analysis.*—Calc'd for C, 52.63; H, 5.30; S, 14.05. Found: C, 52.68; H, 5.27; S, 13.91.

EXAMPLE 9

2-methyl-3-methylsulfonylmethyl-5-methoxyindole

STEP A.—PREPARATION OF 2-METHYL-3-DIMETHYL-AMINOMETHYL-5-METHOXYINDOLE 2-methyl-5-methoxyindole (8.0 grams) is dissolved in 35 ml. of glacial acetic acid with warming. To this solution is added 25% aqueous dimethylamine (9.0 g.) and 37% Formalin solution (4.1 g.). A precipitate forms and the mixture is stirred at room temperature overnight. It is then diluted with water and methanol, and evaporated under vacuum. The residue is extracted with water, and made alkaline with ammonium hydroxide. The precipitate which forms is filtered off, washed with water, and air-dried to give 2-methyl-3-dimethylaminomethyl-5-methoxyindole, M.P. 142–147° C. The product is dissolved in dilute HCl, extracted two times with ether, filtered, and made alkaline with 2.5 N sodium hydroxide. It is then cooled, filtered, washed with water, and air-dried. The product is purified by recrystallization from aqueous acetone solution to yield a product, M.P. 245–249° C.

*Analysis.*—Calc'd. for $C_{13}H_{18}N_2O$: C, 71.52; H, 8.31. Found: C, 71.36; H, 8.32.

STEP B.—PREPARATION OF 2-METHYL-3-METHYL-SULFONYLMETHYL-5-METHOXYINDOLE

To 2-methyl-3-dimethylaminomethyl-5-methoxyindole (2.183 g., 0.01M.) in 75 ml. of ethanol is added sodium methylsulfinate (1.44 g., 0.012M). The mixture is stirred while dimethyl sulfate (1.9 ml., 2.52 g.) is slowly added. The reaction mixture is stirred at room temperature for four hours, heated to reflux for four hours, and then let stand at room temperature overnight. The product is evaporated under vacuum and distributed between water and chloroform. The chloroform solution is washed one time with dilute HCl and three times with water; it is then dried and evaporated under vacuum to give 2.8 grams of product which after recrystallization from boiling ethanol has a melting point of 178–180° C.

*Analysis.*—Calc'd. for $C_{12}H_{15}NO_3S$: C, 56.91; H, 5.97; N, 5.53; S, 12.66. Found: C, 57.09; H, 6.16; N, 5.42; S, 12.63.

What is claimed is:
1. A compound selected from the group consisting of a compound of the formula

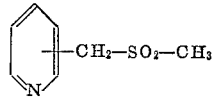

where the methylsulfonylmethylene radical is attached at the 2,3- or 4-position of the pyridine ring.
2. 2-(methylsulfonylmethyl)pyridine.
3. 3-(methylsulfonylmethyl)pyridine.
4. 4-(methylsulfonylmethyl)pyridine.

References Cited

FOREIGN PATENTS 11,130  8/1962  Japan.

OTHER REFERENCES

Cymerman et al.: Journal of the Chem. Soc., London, pp. 1666 (1949).

HENRY R. JILES, *Primary Examiner.*

ALAN L. ROTMAN, *Assistant Examiner.*

U.S. Cl. X.R.

260—283, 302, 304, 307, 308, 309, 309.2, 310, 313.1, 326.12, 329, 332.5, 345.1, 347.2, 999